United States Patent [19]
Hawkins

[11] 4,233,892
[45] Nov. 18, 1980

[54] SPIT ROASTING APPARATUS AND THE SPIT ROASTING OF ROASTABLE FOODSTUFFS

[75] Inventor: David J. D. Hawkins, Johannesburg, South Africa

[73] Assignee: Robin Justice Constance, South Africa

[21] Appl. No.: 15,066

[22] Filed: Feb. 26, 1979

[30] Foreign Application Priority Data
Mar. 22, 1978 [ZA] South Africa ............... 78/1681

[51] Int. Cl.³ ........................................... A47J 37/04
[52] U.S. Cl. ................................. 99/421 M; 60/325; 415/5
[58] Field of Search ............... 99/419, 420, 421, 427; 60/221, 325, 398; 126/8; 185/27; 415/5, 6, 92; 416/7; 134/56, 57

[56] References Cited
U.S. PATENT DOCUMENTS

| | | | |
|---|---|---|---|
| 582,568 | 5/1897 | Winter | 60/325 X |
| 1,483,505 | 2/1924 | Bradshaw | 415/5 |
| 2,520,067 | 8/1950 | Sagen | 126/8 UX |
| 2,804,012 | 8/1957 | Dong | 99/421 M |
| 2,893,407 | 7/1959 | Babson | 134/56 R |
| 3,070,953 | 1/1963 | Carrel | 99/421 M X |
| 3,125,016 | 3/1964 | McDowell | 99/421 M |
| 3,502,019 | 3/1970 | Koons, Jr. | 99/421 H UX |
| 3,630,139 | 12/1971 | Wehrle | 99/421 H |
| 4,085,544 | 4/1978 | Blake | 415/6 X |
| 4,112,686 | 9/1978 | Trotta | 415/5 |

FOREIGN PATENT DOCUMENTS
348603  5/1931  United Kingdom ............... 60/398

Primary Examiner—Harvey C. Hornsby
Assistant Examiner—Arthur O. Henderson
Attorney, Agent, or Firm—Prutzman, Kalb, Chilton & Alix

[57] ABSTRACT

Spit roasting apparatus for the spit roasting of roastable foodstuffs, the apparatus comprising a rotatably supported water wheel for rotatably driving a spit member for supporting roastable foodstuffs to be roasted, the water wheel having a plurality of water-receiving trough formations at spaced intervals along its periphery for receiving water to drive the water wheel. The apparatus includes water feed means for feeding water to the wheel during use, control means for controlling the rate of supply of water to the wheel, and compensating means for compensating for eccentricity in the mass distribution of roastable foodstuff supported on a spit member coupled to water wheel, the compensating means comprising a plurality of compensating buckets which are associated with at least some of the trough formations to receive and store overflow from these trough formations.

15 Claims, 8 Drawing Figures

SPIT ROASTING APPARATUS AND THE SPIT ROASTING OF ROASTABLE FOODSTUFFS

This invention relates to spit roasting apparatus and the spit roasting of roastable foodstuffs.

According to the invention, there is provided spit roasting apparatus for the spit roasting off roastable foodstuffs, the apparatus comprising a rotatably supported water wheel for rotatably driving a spit member for supporting roastable foodstuffs to be roasted, the water wheel having a plurality of water-receiving trough formations at spaced intervals along its periphery for receiving water to drive the water wheel.

The term "roastable foodstuffs" is intended to include foodstuffs such as meat, poultry, fish and the like, which are capable of being roasted.

The apparatus may includes at least one spit member for supporting roastable foodstuff to be roasted.

The spit member may be integral with a shaft of the water wheel. Alternatively, the apparatus may include coupling means for removably coupling the spit member to a shaft of the water wheel.

The spit member may comprise a shaft, cage or structure for supporting roastable foodstuff to be roasted.

The spit member may include locating bracket means for removably locating roastable foodstuff on the spit member.

The water wheel may have an annular peripheral rim or an annulr peripheral channel, and may have any suitable number of the water-receiving trough formations mounted at spaced intervals along the annular rim or within the annular channel, depending upon the evenness of rotation which is required.

In an embodiment of the invention, the water wheel may have at least 8 trough formations at equally spaced intervals, and may conveniently have between about 12 and 30 trough formations mounted along the periphery of the wheel.

Each trough formation may conveniently have a sharp edge along its outer periphery to combat undue spilling and splashing during use.

The spit roasting apparatus may include water feed means for feeding water to the wheel during use.

In one embodiment of the invention, the water feed means may comprise a water supply reservoir to feed water under gravity to the wheel, and a control valve for controlling the flow.

In an alternative embodiment of the invention, the water feed means may comprise a sump provided below the wheel, a pump to pump water from the sump, and a feed conduit to lead water from the pump to a feed zone above the wheel.

In this embodiment of the invention, the apparatus may include control means for controlling the rate of supply of water to the wheel during use.

In an embodiment of the invention, the control means may comprise a recycle conduit leading from the feed conduit to the sump, and an adjustable recycle control valve in the recycle conduit to control the rate at which water is recycled to the sump.

In an alternative embodiment, the control means may comprise a feed control valve associated with the feed conduit, a float member to operate the feed control valve, and a control vessel which is provided in the sump for receiving water discharged from the water wheel, the control vessel having the float supported therein, having a discharge conduit leading to the sump, and having an adjustable discharge control valve associated with the discharge conduit for controlling the water level in the control vessel and thus the operation of the feed control valve.

In this embodiment of the invention, the apparatus may include a recycle conduit leading from the feed conduit to the sump, and a pressure relief valve in the recycle conduit to permit recycle of water through the recycle conduit as the feed control valve restricts flow through the feed conduit.

The spit roasting apparatus may include compensating means for compensating for eccentricity in the mass distribution of roastable foodstuff supported on a spit member coupled to the water wheel.

In one embodiment of the invention the compensating means may comprise an adjustable mass which can be adjusted both radially and circumferentially to balance the wheel after roastable foodstuff has been mounted on the spit member.

In an alternative embodiment of the invention, the compensating means may comprise a plurality of compensating buckets which are associated with at least some of the trough formations to receive and store overflow from the trough formations and thereby compensate for mass eccentricity of roastable foodstuff supported on the spit member during use.

Each compensating bucket may be rotatably supported on a support arm extending from the wheel or from a trough formation with which the bucket is associated.

Each trough formation having a compensating bucket associated therewith, may have an overflow pipe extending therefrom to lead overflow to the bucket.

In an embodiment of the invention, the support arms may be hollow to constitute the overflow pipes.

In this embodiment of the invention, each overflow pipe may have intake opening in communication with the trough formation, and a discharge opening to discharge into a compensating bucket supported thereon.

It will be appreciated that each overflow opening will be provided at a sufficient height relatively to the base of the trough with which it is associated, to allow the trough to accommodate a sufficient quantity of water for overcoming frictional resistance of the wheel, before water can overflow into its compensating bucket.

In an embodiment of the invention, the overflow pipes may be adjustable to permit adjustment of the heights of their intake openings relatively to the bases of the trough formations on which they are mounted.

In this embodiment of the invention, by adjusting the heights of such intake openings along a selected arc of the wheel, uneven rotation of the wheel can be achieved to provide for uneven roasting of roastable foodstuff supported on a spit member, if desired.

The spit roasting apparatus may include a water wheel frame on which the water wheel is rotatably supported, with the frame being supported on wheels.

The wheels may conveniently be in the form of castors or the like.

In this embodiment of the invention the water feed means may conveniently be mounted on the water wheel frame.

The water wheel frame together with the water wheel and water feed means may therefore be displaced as a unit for transportation, for cleaning, or the like.

The spit roasting apparatus may include at least one firebox member comprising a firebox supported in a firebox frame, the firebox member having support means for rotatably supporting a spit member thereon.

In this embodiment of the invention the firebox frame may be supported on wheels, and the apparatus may include coupling means for removably coupling the firebox frame to the water wheel frame. Alternatively, if desired, the firebox frame may be integrally connected to the water wheel frame.

In an alternative embodiment of the invention, the spit roasting apparatus may have the water wheel rotatably supported in a permanent installation, and the installation may include at least one firebox having support means for rotatably supporting a spit member thereon.

The spit roasting apparatus mya include a fume exhaust system for exhausting fumes during use, and an air supply system for supplying air to balance the fumes and air withdrawn by the fume exhaust system.

In an embodiment of the invention, the air supply system may include a supply conduit having a firebox opening to supply air to the firebox, and the apparatus may include an adjustable flap to co-operate with the firebox opening for controlling the supply of air to the firebox.

The invention further extends to a method of rotatably driving a spit member of a spit roasting apparatus, which includes the steps of operatively associating a rotatably supported water wheel with the spit member, the water wheel having a plurality of water-receiving trough formations at spaced intervals along its periphery, and feeding water to the wheel to drive the wheel.

While the water wheel and spit roasting apparatus of this invention may be made of any desired material or materials, they may conveniently be made of stainless steel, chromium-coated steel, aluminum, synthetic plastics materials, or the like, to provide an appearance which will have visual appeal.

Embodiments of the invention are now described by way of example with reference to the accompanying drawings.

With reference to FIGS. 1 to 6 of the drawings, reference numeral 12.1 refers generally to a spit roasting apparatus in accordance with this invention, for the spit roasting of roastable foodstuffs such as, for example, meat.

The spit roasting apparatus 12.1 is in the form of a permanent installation.

Figure 1:
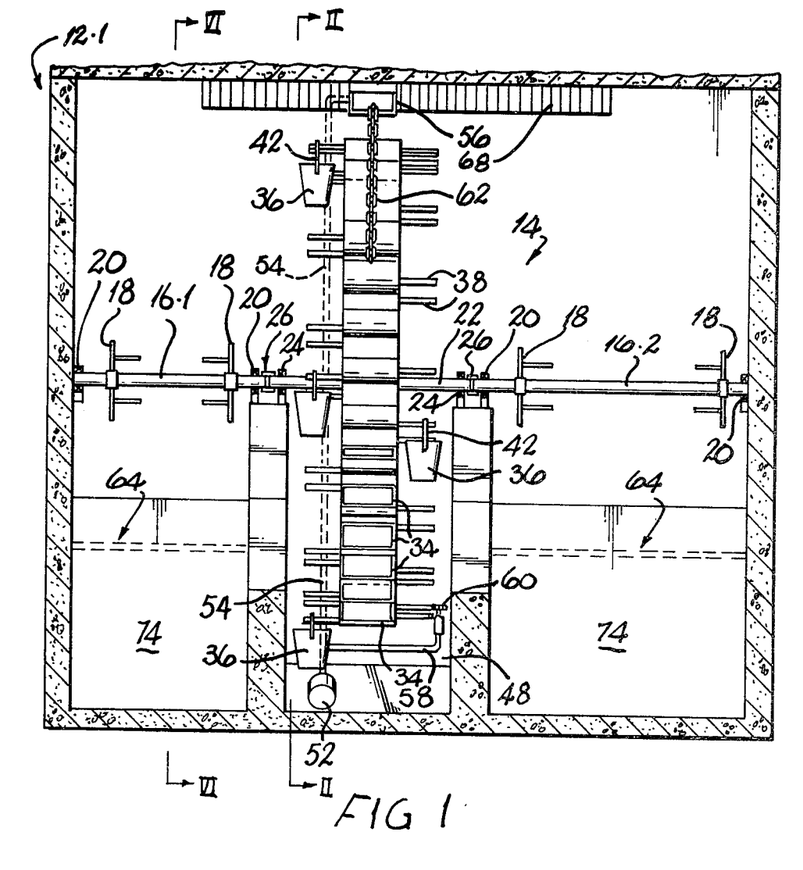
FIG. 1 shows a partly sectional, diagrammatic, front elevation of one embodiment of a spit roasting apparatus in accordance with this invention.
Figure 2:
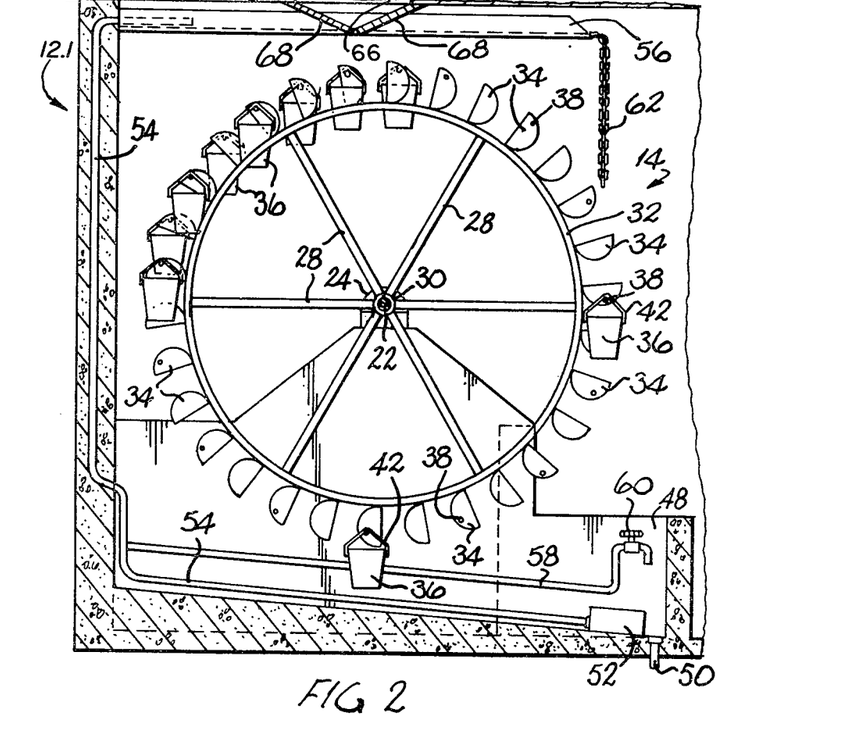
FIG. 2 shows a diagrammatic, sectional, side elevation of the spit roasting apparatus of FIG. 1, along line II—II of FIG. 1.

The spit roasting apparatus 12.1 comprises a rotatably supported water wheel 14 and spit members in the form of a rotatably mounted elongated shafts 16.1 and 16.2 on opposed sides of the water wheel 14.

Each spit member 16.1 and 16.2 is shown having a pair of locating brackets 18 positioned thereon for locating meat such as a portion of beef, a lamb, a pig, or the like, thereon.

Each spit member 16.1 and 16.2 is rotatably supported in bearings 20.

The water wheel 14 has a shaft 22 which is rotatably supported on bearings 24.

The apparatus 12 includes coupling means 26 for coupling the spit members 16 to the shaft 22 and thus to the water wheel 14, when required.

The water wheel 14 has a plurality of spokes 28 extending radially outwardly from a central boss 30, and has an annular peripheral rim 32.

The water wheel 14 has 30 water receiving troughs 34 mounted at equally spaced intervals along the annular rim 32.

Figure 3:
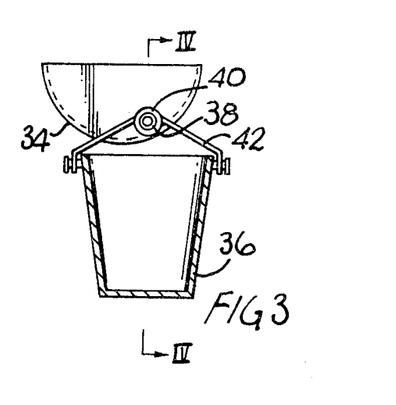
FIG. 3 shows, to an enlarged scale, a detail sectional end elevation along line III—III of FIG. 4, of one of the trough formations and compensating buckets of the water wheel of the installation.
Figure 4:
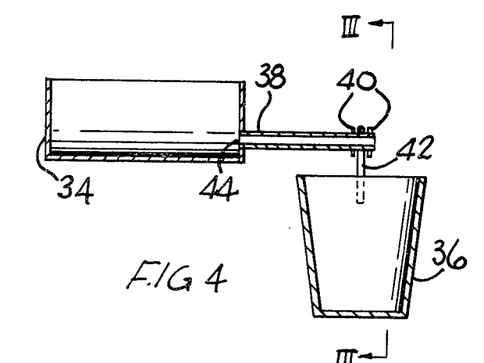
FIG. 4 shows a sectional side elevation along line IV—IV of FIG. 3.

Each trough 34 is shaped to have a sharp edge along its outer periphery to combat undue spilling and splashing during use.

The water wheel 14 includes compensating means for compensating for eccentricity in the mass distribution of meat supported on either or both of the spit members 16.1 and 16.2.

The compensating means comprises a compensating bucket 36 rotatably associated with each trough 34. For the sake of clarity, only a few compensating buckets 36 have been illustrated in the drawings. It will be appreciated however that each trough 34 has a compensating bucket 36 associated therewith and that the compensating buckets 36 are in staggered relationship on opposed sides of the water wheel 14 to prevent interference between successive buckets during use.

Each trough 34 has a support arm 38 extending therefrom for rotatably supporting a bucket 36 thereon.

Each support arm 38 has a pair of spaced flanges 40 for locating a bucket 36 on the arm 38.

Each bucket 36 has a handle 42 which fits between a pair of spaced flanges 40 to locate the bucket on the support arm 38.

Since each bucket 36 is rotatably supported on a support arm 38, the bucket will remain upright during rotation of the water wheel 14 and will thus store any water contained therein.

Each support arm 38 is hollow to constitute an overflow pipe to feed overflow from the trough 34 into the bucket 36. Each overflow pipe has an intake 44 through which water enters the overflow pipe from a trough 34 and flows into its bucket 36.

The intakes 44 are spaced a sufficient distance above the bases of the troughs so that the quantity of water accommodated in each trough during use below the intake 44, will be sufficient to overcome the friction of the water wheel and thus cause the water wheel to rotate before water flows through the overflow pipe into a bucket 36.

Each intake 44 is positioned radially outwardly of the centre of each trough 34 so that overflow water will flow into the bucket 36 after the trough in question has moved downwardly below its horizontal position on the wheel 14 during use.

Figure 5:
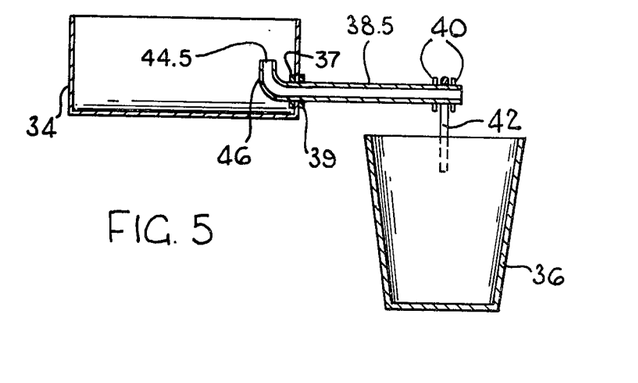
FIG. 5 shows a view similar to that of FIG. 4, of an alternative embodiment of a trough formation in accordance with this invention.

An alternative embodiment of the invention is illustrated in FIG. 5 of the drawings, where each support arm 38.5 has a U-bend 46 with the intake 44.5 provided at the free end of the U-bend 46.

In this embodiment, each support arm 38.5 is pivotally displaceable relatively to the trough 34 about its elongated axis to allow for adjustment of the height of the intake 44.5 relatively to the base of the trough 34.

Thus, in the embodiment of FIG. 5, by adjusting the height of the intake 44.5, the quantity of water contained in a trough 34 before it overflows into the bucket 36 of that trough can be adjusted.

In this way, the support arm 38.5 can be adjusted to adjust the quantity of water contained in each trough to overcome the frictional resistances of the water wheel 14. In addition, by adjusting the heights of the intakes 44.5 over an arc of the water wheel 14, the water wheel 14 can be adjusted so that it will rotate unevenly, thereby allowing for meat supported on a spit member 16 to be roasted unevenly. In this way, meat can be roasted so that portions done to varying degrees can be served as required.

As can be seen in FIG. 5, each support arm 38.5 extends through a bore in the wall defining the trough 34. Each support arm 38.5 has a sealing shoulder mounted thereon to engage sealingly with the inner surface of the wall defining the trough 34, and has a threaded portion whereon a locking nut 39 is provided.

Each support arm 38.5 can therefore be secured in its desired position by tightening the locking nut 39.

Where the intakes 44 are all at the same height relatively to the bases of their respective troughs 34, water overflow during use into the various buckets 36 will automatically compensate for mass eccentricity of meat supported on either or both of the spit members 16.

In addition, when meat has been carved from a portion supported on a spit member, automatic mass compensation will continue during use.

The split roasting apparatus 12.1 therefore provides the advantage that automatic compensation is provided for mass eccentricity of meat supported on either or both of the spit members 16, thereby ensuring even rotation of the water wheel 14 during use and thus even roasting of the meat.

In the embodiment illustrated in FIG. 5 of the drawings, once the intakes 44.5 have been set a steady state uneven rotation of the water wheel 14 will be secured thereby providing for uneven roasting of meat as required.

In the embodiment of the invention illustrated in the drawings, the water wheel 14 has a diameter of about 1,5 meters and a width of about 150 mm. Further, each bucket 36 has a volume of about 2 liters.

The water wheel 14 is conveniently made out of stainless steel, aluminum or chrome plated metal, as are the troughs 34 and the buckets 36.

The apparatus 12.1 includes water feed means for feeding water to the wheel 14 during use.

The apparatus 12.1 therefore includes a sump 48 into which water discharged from the water wheel during use, is stored.

The sump 48 has a drain outlet 50.

An electrically powered motor and pump unit 52 is located in the sump, and has a feed conduit 54 leading therefrom to a feed channel 56 above the water wheel 14.

The feed conduit 54 has a recycle conduit 58 leading therefrom to recycle water to the sump 48.

The recycle conduit 58 includes an adjustable recycle control valve 60 which can be adjusted to control the quantity of water recycled to the sump 48, and thus the quantity of water fed to the feed channel 56.

The adjustable valve 60 has a number of settings to allow it to be adjusted as required for a desired rate of flow from the feed channel 56 and thus a desired rate of rotation of the water wheel 14.

The feed channel 56 has a chain 62 depending therefrom to lead water with limited splashing, down to the troughs 34 during use.

In use, after meat has been mounted on the spit members 16, the spit members 16 can be coupled by the coupling means 26 to the shaft 22 and the motor and pump unit 52 can be started with sufficient water in the sump 48. A water supply conduit (not shown) is provided to feed water to the sump 48.

The adjustable valve 60 can then be set to provide a desired rate of flow from the feed channel 56 into the troughs 34 below the chain 62.

Water will flow into the trough 34 below the chain 62 and will overflow through the overflow pipe into the bucket 36 associated with that trough 34 until the mass is sufficient to overcome the mass eccentricity of meat provided on the spit members and commence rotation of the water wheel 14.

This will continue until the water distribution in the compensating buckets 36 is appropriate to balance the wheel 14, whereafter the wheel 14 will continue to rotate at a steady state under the mass of the water which is supplied to each successive trough 34, without further water overflowing into the compensating buckets 36.

If the mass eccentricity of the meat varies as a result of portions being cut off, automatic compensation will occur within a relatively few revolutions of the wheel 14.

The rate of rotation of the wheel 14 will depend upon the mass of meat supported on the spit members and on the rate of water supplied through the feed channel 56.

As the mass of meat is reduced when a spit member is uncoupled from the shaft 22 and carved, the rate of water supply can be adjusted by means of the valve 60, to maintain the required rate of rotation.

The apparatus 12.1 further includes a fire bed zone under each spit member 16.

The apparatus 12.1 further includes a fume exhaust system above the spit roast apparatus 12.1.

The fume exhaust system includes exhaust fans (not shown) to draw fumes and air through a fume outlet 66 via filter screens 68.

The apparatus 12.1 further includes an air supply system including a blower (not shown) to supply air through a supply conduit 70 to the apparatus 12.1.

The air supply system is coupled to the fume exhaust system so that the supply of air through the supply conduit 70 balances the fumes and air withdrawn through the fume outlet 66.

This provides the advantage that flow relatively to the apparatus will be balanced thereby combatting air draughts towards the apparatus 12.1.

Figure 6:
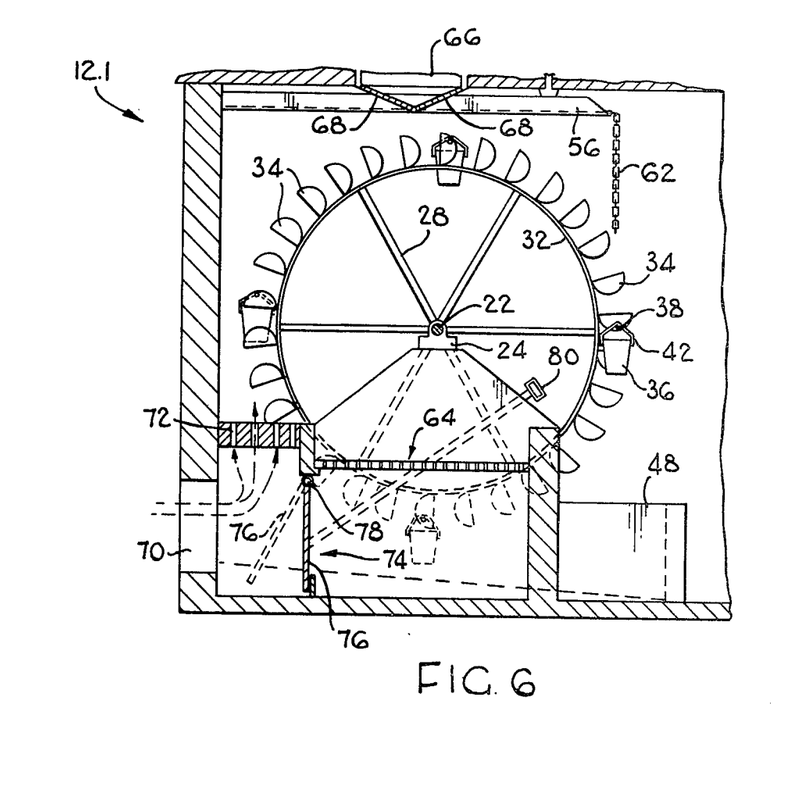
FIG. 6 shows a diagrammatic, sectional, side elevation along line VI—VI of FIG. 1.

The supply conduit 70 leads to bypass grids 72 through which air supplied through the conduit 70 can enter and by pass the fire bed zones 64.

Each fire bed zone 64 has a fire bed opening 74 which is protected by an adjustable flap 76.

Each adjustable flap 76 is hinged at its upper end about a hinge 78 and includes a control handle 80 for adjusting the position of the flap 76.

Thus by adjusting the position of the flap 76, the fire bed opening 74 can be closed entirely as shown in FIG. 6 of the drawings, whereupon all the air supplied through the conduit 70 will enter through the bypass grids 72.

Each flap 76 can be displaced through several positions between its closed position and a fully open position where air from the supply conduit enters through the fire bed zone 64.

Thus each fire bed zone 64 can be controlled by controlling the supply of air thereto through its fire bed opening 74.

In particular, if the fire bed has died down and it is required to revive the fire bed, a substantial air supply through the fire bed zone 64 will cause rapid revival thereof.

The apparatus as illustrated in FIGS. 1 to 6 of the drawings therefore provides the advantage that fumes generated during roasting of meat can be effectively removed, and that by compensating with air supply by means of the air supply system, the creation of undue draughts can be avoided. In addition, by controlling the adjustable flaps 76, the fire beds 64 can be controlled and, in particular, can be revived rapidly when required.

The apparatus as illustrated in the drawings provides the further advantage that it can provide a visual impact and appeal for customers. Furthermore, the water wheel 14 automatically compensates for mass eccentricity of meat provided on the spit members, and in the embodiment of FIG. 5 the rotation of the water wheel can be adjusted so that it is uneven to provide uneven roasting as required.

The apparatus provides the further advantage that since water is recycled, a reasonably low volume of water is employed during use. In addition, a relatively small motor and pump unit 52 can be employed and the cost of electricity for the pump will therefore be relatively low.

Furthermore, by means of the adjustable valve 60, the rate of rotation of the water wheel 14 can readily be adjusted as required.

It will be appreciated that if the sump 48 has a sufficient height to accommodate the rim portion, troughs and buckets as they move through the sump, the sump can be filled with an aqueous solution of an appropriate cleaning fluid after use, and the water wheel can then be effectively cleaned after use by rotating it for a suitable number of revolutions through the sump. Thereafter the sump can be drained and refilled with washing water to wash off the aqueous cleaning fluid.

Figure 7:
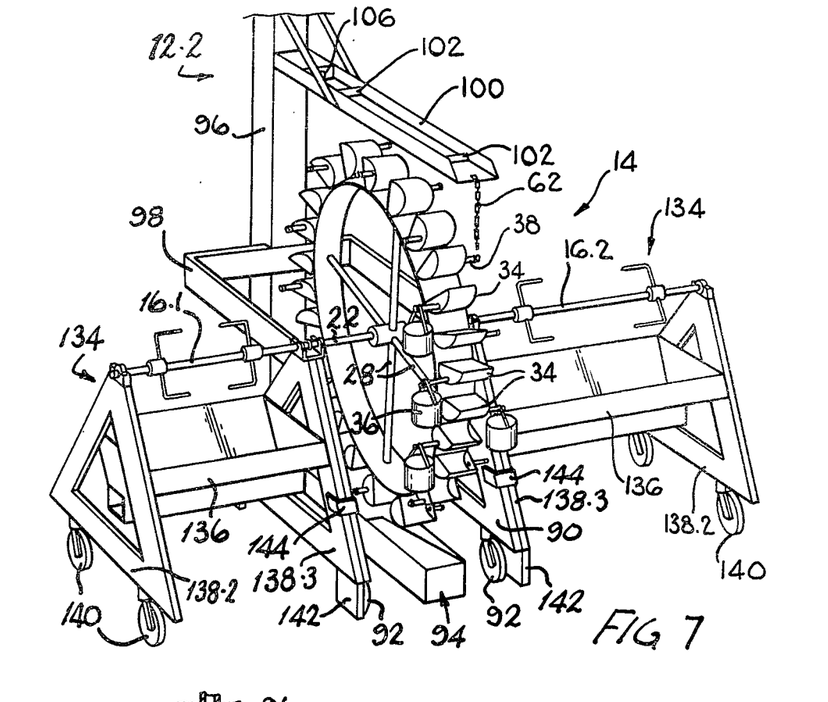
FIG. 7 shows a diagrammatic, three-dimensional view of an alternative embodiment of a spit roasting apparatus in accordance with this invention.
Figure 8:
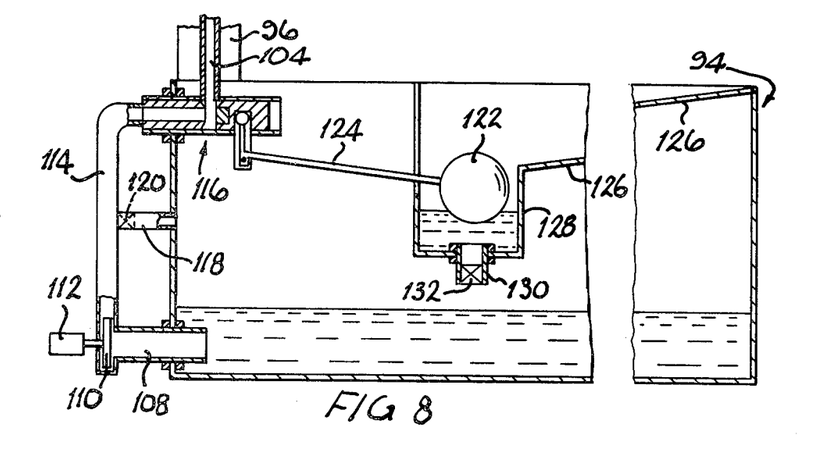
FIG. 8 shows, to an enlarged scale, a fragmentary, cross-sectional view of portion of the water feed means of the apparatus of FIG. 7.

With reference to FIGS. 7 and 8 of the drawings, reference numeral 12.2 refers generally to an alternative embodiment of a spit roasting apparatus in accordance with this invention.

The spit roasting apparatus 12.2 corresponds substantially with the spit roasting apparatus 12.1. Corresponding parts are therefore indicated by corresponding reference numerals.

The spit roasting apparatus 12.2 differs from the roasting apparatus 12.1, in that the spit roasting apparatus 12.2 is not in the form of a permanent installation.

The spit roasting apparatus 12.2 includes a water wheel 14 which corresponds in all respect with the water wheel 14 of the apparatus 12.1.

In the spit roasting apparatus 12.2, the water wheel 14 is rotatably supported on a water wheel frame 90.

The water wheel frame 90 is supported on castors 92.

The water wheel frame 90 further has water feed means integrally mounted thereon.

The water feed means includes a sump 94 which is mounted below the water wheel 14.

The water feed means further includes a tubular support member 96 which projects upwardly from the sump 94.

The tubular support member 96 is supported on the water wheel frame 90 by means of a channel section bracket 98.

The tubular support member 96 has a feed channel 100 extending therefrom and supported thereby. The feed channel 100 corresponds with the feed channel 56 of the apparatus 12.1.

The feed channel 100 has a plurality of transverse walls 102 to retard the rate of flow of water down the feed channel 100.

The water feed means further includes a feed conduit 104 which extends from the sump 94 within the tubular support member 96, and has a discharge outlet 106 leading into the feed channel 100.

The sump 94 has an outlet conduit 108 leading out of the sump 94.

The outlet conduit 108 leads to the intake of a pump 110 which is operatively coupled to a motor 112 for driving the pump 110.

A discharge conduit 114 leads from the discharge of the pump 110 to the feed conduit 104 via a feed control valve 116.

The water feed means further includes a recycle conduit 118 to recycle water from the discharge conduit 114 to the sump 94. The recycle conduit 118 includes a pressure relief valve 120.

The water feed means further comprises a float member 122 which is operatively associated with the feed control valve 116 by means of an arm 124, thereby allowing the float member 122 to control operation of the feed control valve 116.

The sump 94 has a control vessel 126 provided therein for receiving water discharged from the water wheel 14 during use.

The control vessel 126 has a cylindrical level control sleeve 128 wherein the float member 122 is positioned.

The sleeve 128 has a discharge conduit 130 leading to the sump 94, and an adjustable discharge control valve 132 is provided in the discharge conduit 130 for controlling the water level in the sleeve 128 and thus the operation of the feed control valve 116.

Because the sleeve 128 has a relatively small area, rapid water level variations will be reflected therein for any variations in the rate of water discharged from the wheel 14.

As the water level rises in the sleeve 128, the float member 122 will be raised to displace the feed control valve 116 towards its closed position until it closes completely. Conversely, as the water level drops in the sleeve 128, the float member 122 will drop until the feed control valve 116 is in its completely open position.

Thus by adjusting the adjustable discharge control valve 132, the float member 122 will be supported at an appropriate height in the sleeve 128 for a required rate of flow through the feed conduit 104 and thus a desired rate of rotation of the wheel 14.

Thus the rate of rotation of the wheel 14 which is required, can readily be adjusted by means of the discharge control valve 132.

When the feed control valve 116 is displaced towards its closed position, the pressure increases in the discharge conduit 114 until it reaches the stage where the pressure relief valve 120 will open to allow water to recycle into the sump 94.

The water wheel 14 and the water feed means is therefore securely supported on the water wheel frame 90, and can be moved as a unit for transportation, cleaning or maintenance.

For installing the water wheel frame 90, it can merely be wheeled into position, the motor 112 can be coupled to a source of electrical power, and a sufficient quantity of water can be provided in the sump 94.

If desired, a water supply conduit may be connected to the sump 94, and a float operated valve may be provided to maintain a constant level of water in the sump 94.

The apparatus 12.2 further includes a pair of corresponding firebox members 134.

Each firebox member 134 comprises a firebox 136 supported in a firebox frame comprising firebox frame members 138.2 and 138.3.

Each firebox member 134 has a spit member 16.1 or 16.2 rotatably supported thereon.

Each firebox frame member 138.2 is supported on castors 140, whereas each firebox frame member 138.3 is supported on feet 142.

Each firebox member 134 can therefore be displaced by raising the frame member 138.3 and moving it along the castors 140.

The apparatus 12.2 includes channel section clamps 144 for removably clamping the frame members 138.3 to the water wheel frame 90.

The apparatus 12.2 may include a fume exhaust system and an air supply system corresponding to that of the apparatus 12.1.

These systems may conveniently be provided in a separate installation for association with the apparatus 12.2.

In the same way as described with reference to the apparatus 12.1, the fireboxes 136 may be provided with firebed openings and adjustable flaps to control the flow of air from the air supply system into the fireboxes 136.

While the apparatus 12.2 can provide the same advantages as the apparatus 12.1, the apparatus 12.2 provides the further advantage that a substantially complete, or complete roasting apparatus 12.2 is provided which can readily be transported to a desired location, can be moved for maintenance or cleaning, and can readily be installed for operation without any, or with only limited constructional work being required.

The embodiments of the invention as illustrated in the drawings provide the further advantage that a visually appealing and attractive spit roasting apparatus can be provided which can constitute a feature in a restaurant, and which is simple and effective to operate.

I claim:

1. Spit roasting apparatus comprising a spit member for supporting roastable foodstuffs to be roasted, a rotatably supported water wheel for rotatably driving said spit member, said water wheel having a plurality of water-receiving trough formations at spaced intervals along its periphery for receiving water to drive the water wheel and automatic compensating means associated with the water wheel for automatically compensating for eccentricity in the mass distribution of roastable foodstuffs supported on the spit member.

2. Spit roasting apparatus according to claim 1, including water feed means for feeding water to the wheel during use.

3. Spit roasting apparatus according to claim 2, in which the water feed means comprises a sump provided below the wheel, a pump to pump water from the sump, and a feed conduit to lead water from the pump to a feed zone above the wheel.

4. Spit roasting apparatus according to claim 3, including control means for controlling the rate of supply of water to the wheel.

5. Spit roasting apparatus according to claim 4, in which the control means comprises a recycle conduit leading from the feed conduit to the sump, and an adjustable recycle control valve in the recycle conduit to control the rate at which water is recycled to the sump.

6. Spit roasting apparatus according to claim 4, in which the control means comprises a feed control valve associated with the feed conduit, a float member to operate the feed control valve, and a control vessel in the sump for receiving water discharged from the water wheel, the control vessel having the float supported therein, having a discharge conduit leading to the sump, and having an adjustable discharge control valve associated with the discharge conduit for controlling the water level in the control vessel and thus the operation of the feed control valve.

7. Spit roasting apparatus according to any one of claim 1, including a water wheel frame on which the water wheel is rotatably supported, the frame being supported on wheels.

8. Spit roasting apparatus according to claim 7, including at least one firebox member comprising a firebox supported in a firebox frame, the firebox member having support means for rotatably supporting a spit member thereon.

9. Spit roasting apparatus according to claim 8, in which the firebox frame is supported on wheels, and in which the apparatus includes coupling means for removably coupling the firebox frame to the water wheel frame.

10. Spit roasting apparatus according to any one of claim 1, in which the water wheel is rotatably supported in a permanent installation, and in which the installation includes at least one firebox having support means for rotatably supporting a spit member thereon.

11. Spit roasting apparatus according to claim 10, including a fume exhaust system for exhausting fumes during use, and an air supply system for supplying air to balance the fumes and air withdrawn by the fume exhaust system.

12. Spit roasting apparatus according to claim 11, in which the air supply system includes a supply conduit having a firebox opening to supply air to the firebox, and in which the apparatus includes an adjustable flap to co-operate with the firebox opening for controlling the supply of air to the firebox.

13. Spit roasting apparatus comprising a spit member for supporting rotatable foodstuffs to be roasted, a rotatably supported water wheel for rotatably driving said spit member, said water wheel having a plurality of water-receiving trough formations at spaced intervals along its periphery for receiving water to drive the water wheel, and compensating means for compensating for eccentricity in the mass distribution of roastable foodstuffs supported on the spit member, said compensating means comprising a plurality of compensating buckets which are associated with at least some of the trough formations to receive and store overflow from these trough formations.

14. Spit roasting apparatus according to claim 13, in which each compensating bucket is rotatably supported on an overflow pipe which extends from the trough formation with which it is associated, each overflow pipe having an intake opening in communication with the trough formation, and a discharge opening to discharge into a compensating bucket supported thereon.

15. Spit roasting apparatus according to claim 14, in which the overflow pipes are adjustable to permit adjustment of the heights of their intake openings relatively to the bases of the trough formations on which they are mounted.

* * * * *